United States Patent
Matsumura

(10) Patent No.: US 12,074,275 B2
(45) Date of Patent: Aug. 27, 2024

(54) SLURRY COMPOSITION FOR ALL-SOLID-STATE SECONDARY BATTERY, SOLID ELECTROLYTE-CONTAINING LAYER, AND ALL-SOLID-STATE SECONDARY BATTERY

(71) Applicant: ZEON CORPORATION, Tokyo (JP)

(72) Inventor: Taku Matsumura, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 691 days.

(21) Appl. No.: 17/267,495

(22) PCT Filed: Aug. 23, 2019

(86) PCT No.: PCT/JP2019/033144
§ 371 (c)(1),
(2) Date: Feb. 10, 2021

(87) PCT Pub. No.: WO2020/045306
PCT Pub. Date: Mar. 5, 2020

(65) Prior Publication Data
US 2021/0328259 A1 Oct. 21, 2021

(30) Foreign Application Priority Data
Aug. 31, 2018 (JP) ................................ 2018-163661

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/0068* (2013.01)

(58) Field of Classification Search
CPC ..................... H01M 10/0562; H01M 10/0525
See application file for complete search history.

(56) References Cited

U.S. PATENT DOCUMENTS

| | | | |
|---|---|---|---|
| 10,424,778 B2 | 9/2019 | Mochizuki et al. | |
| 10,756,352 B2 | 8/2020 | Yoon et al. | |
| 2014/0004257 A1 | 1/2014 | Kubo et al. | |
| 2017/0214051 A1 | 7/2017 | Yoon et al. | |
| 2018/0053932 A1 | 2/2018 | Jeong | |
| 2018/0062162 A1 | 3/2018 | Maeda | |
| 2018/0076481 A1 | 3/2018 | Makino et al. | |
| 2018/0090748 A1 | 3/2018 | Mochizuki et al. | |
| 2018/0277901 A1* | 9/2018 | Mochizuki | H01M 10/0562 |
| 2021/0234194 A1 | 7/2021 | Mochizuki et al. | |

FOREIGN PATENT DOCUMENTS

| | | |
|---|---|---|
| CN | 107039655 A | 8/2017 |
| CN | 107615551 A | 1/2018 |
| CN | 107735887 A | 2/2018 |
| CN | 107768714 A | 3/2018 |
| JP | 2012178256 A | 9/2012 |
| JP | 2012212652 A | 11/2012 |
| JP | 2012243476 A | 12/2012 |
| JP | 2013058376 A | 3/2013 |
| JP | 2013143299 A | 7/2013 |
| JP | 2014241240 A | 12/2014 |
| JP | 2016143614 A | 8/2016 |
| JP | 2017135094 A | 8/2017 |
| JP | 2018088306 A | 6/2018 |
| WO | 2016152262 A1 | 9/2016 |
| WO | 2020075749 A1 | 4/2020 |

OTHER PUBLICATIONS

May 3, 2022, the Extended European Search Report issued by the European Patent Office in the corresponding European Patent Application No. 19856276.1.
Nov. 19, 2019, International Search Report issued in the International Patent Application No. PCT/JP2019/033144.
Mar. 2, 2021, International Preliminary Report on Patentability issued in the International Patent Application No. PCT/JP2019/033144.

* cited by examiner

*Primary Examiner* — Olatunji A Godo
(74) *Attorney, Agent, or Firm* — KENJA IP LAW PC

(57) ABSTRACT

Disclosed is a slurry composition for an all-solid-state secondary battery which comprises an inorganic solid electrolyte, a binder, a basic functional group-containing compound, and a solvent, wherein an amount of the basic functional group-containing compound is 0.005 parts by mass or more and 5 parts by mass or less per 100 parts by mass of the inorganic solid electrolyte.

10 Claims, No Drawings

SLURRY COMPOSITION FOR ALL-SOLID-STATE SECONDARY BATTERY, SOLID ELECTROLYTE-CONTAINING LAYER, AND ALL-SOLID-STATE SECONDARY BATTERY

TECHNICAL FIELD

The present disclosure relates to a slurry composition for an all-solid-state secondary battery, a solid electrolyte-containing layer, and an all-solid-state secondary battery.

BACKGROUND

Recently, there is a growing demand for using secondary batteries such as lithium ion secondary batteries in a wide variety of applications including household small power storage devices, motorcycles, electric vehicles and hybrid electric vehicles, in addition to portable terminals such as portable information terminals and portable electronic devices. With their widespread applications, secondary batteries are required to be more safe.

Against this backdrop, all-solid-state secondary batteries have attracted attention as highly safe secondary batteries. They use inorganic solid electrolytes instead of organic solvent electrolytes, which are highly flammable and as such have a high risk of ignition in the event of leakage.

An all-solid-state secondary battery has a positive electrode, a negative electrode, and a solid electrolyte layer positioned between the positive and negative electrodes. The electrodes (positive and negative electrodes) are each formed for example by applying on a current collector a slurry composition which comprises an electrode active material (positive or negative electrode active material), a binder, and an inorganic solid electrolyte, and drying the applied slurry composition to form an electrode mixed material layer (positive or negative electrode mixed material layer) on the current collector. The solid electrolyte layer is formed for example by applying on an electrode or a releasable substrate a slurry composition which comprises a binder and an inorganic solid electrolyte and drying the applied slurry composition.

As a practical slurry composition for an all-solid-state secondary battery, for example, PTL 1 discloses a slurry for forming an electrode mixed material layer, which comprises heptane as a main solvent, tributylamine as a sub-solvent, a hydrogenated butadiene rubber as a binder, an electrode active material, and a sulfide solid electrolyte.

CITATION LIST

Patent Literature

PTL 1: JP2012212652A

SUMMARY

Technical Problem

However, the conventional slurry composition for an all-solid-state secondary battery described above has room for improvement in increasing the fluidity for an improved leveling property during application, as well as in increasing the ion conductivity of a layer containing a solid electrolyte (hereinafter referred to as a "solid electrolyte-containing layer") formed using the slurry composition, such as a solid electrolyte layer or an electrode mixed material layer.

An object of the present disclosure is therefore to provide a slurry composition for an all-solid-state secondary battery which has high fluidity and hence has a good leveling property during application and which can form a solid electrolyte-containing layer having good ion conductivity.

Another object of the present disclosure is to provide a solid electrolyte-containing layer having good ion conductivity, and an all-solid-state secondary battery which comprises a solid electrolyte-containing layer having good ion conductivity.

Solution to Problem

The inventor conducted diligent investigation with the aim of solving the problem set forth above. The inventor newly found that slurry compositions which comprise an inorganic solid electrolyte, a binder, a predetermined amount of a basic functional group-containing compound, and a solvent have high fluidity and hence a good leveling property during application, and can form a solid electrolyte-containing layer having good ion conductivity. The inventor thus completed the present disclosure.

That is, the present disclosure aims at advantageously solving the problem set forth above, and the disclosed slurry composition for an all-solid-state secondary battery comprises an inorganic solid electrolyte, a binder, a basic functional group-containing compound, and a solvent, wherein an amount of the basic functional group-containing compound is 0.005 parts by mass or more and 5 parts by mass or less per 100 parts by mass of the inorganic solid electrolyte. When a basic functional group-containing compound is included in the amount described above, it is possible to increase the fluidity of the slurry composition to improve the leveling property during application, and also to allow a solid electrolyte-containing layer formed using the slurry composition to exhibit good ion conductivity.

In the disclosed the slurry composition for an all-solid-state secondary battery, it is preferred that the basic functional group of the basic functional group-containing compound comprises a nitrogen atom having an unpaired electron. When the basic functional group of the basic functional group-containing compound comprises a nitrogen atom having an unpaired electron, a high leveling property of the slurry composition during application and a high ion conductivity of the resulting solid electrolyte-containing layer can be achieved at the same time.

In the disclosed the slurry composition for an all-solid-state secondary battery, it is preferred that the basic functional group-containing compound has a hydrocarbon group having 3 or more carbon atoms. When a basic functional group-containing compound having a hydrocarbon group having 3 or more carbon atoms is used, a high leveling property of the slurry composition during application and a high ion conductivity of the resulting solid electrolyte-containing layer can be achieved at the same time.

In the disclosed the slurry composition for an all-solid-state secondary battery, it is preferred that the basic functional group-containing compound comprises at least one compound selected from the group consisting of amines and nitriles. When an amine and/or nitrile is used, a high leveling property of the slurry composition during application and a high ion conductivity of the resulting solid electrolyte-containing layer can be achieved at the same time.

In the disclosed the slurry composition for an all-solid-state secondary battery, it is preferred that the basic functional group-containing compound is an acyclic compound. When the basic functional group-containing compound is an acyclic compound, the fluidity of the slurry composition can be further increased, whereby the leveling property of the slurry composition during application can be further improved.

In the disclosed the slurry composition for an all-solid-state secondary battery, it is preferred that the basic functional group-containing compound is a primary amine or a secondary amine. When the basic functional group-containing compound is a primary amine or a secondary amine, the fluidity of the slurry composition can be further increased, whereby the leveling property of the slurry composition during application can be further improved.

In the disclosed the slurry composition for an all-solid-state secondary battery, it is preferred that the solvent is at least one solvent selected from the group consisting of hexane, diisobutyl ketone, butyl butyrate, and xylene. When the solvent is one, or a mixture of two or more, of solvents selected from the group consisting of hexane, diisobutyl ketone, butyl butyrate and xylene, the ion conductivity of the solid electrolyte-containing layer formed using the slurry composition can be further increased.

In the disclosed the slurry composition for an all-solid-state secondary battery, it is preferred that the inorganic solid electrolyte comprises a sulfide inorganic solid electrolyte. When an inorganic solid electrolyte comprising a sulfide inorganic solid electrolyte is used, it is possible to form a solid electrolyte-containing layer having better ion conductivity.

It is preferred that the disclosed slurry composition for an all-solid-state secondary battery further comprises an electrode active material. When the slurry composition comprises an electrode active material, an electrode mixed material layer can be favorably formed using the slurry composition.

It is preferred that the disclosed slurry composition for an all-solid-state secondary battery further comprises a conductive material. When a conductive material is further included in the slurry composition containing an electrode active material, the electric resistance of the electrode mixed material layer formed using the slurry composition can be favorably reduced.

The present disclosure also aims to advantageously solve the problem set forth above, and the disclosed solid electrolyte-containing layer is formed using any of the slurry compositions described above. A solid electrolyte-containing layer formed using any of the slurry compositions described above can exhibit good ion conductivity.

The present disclosure also aims to advantageously solve the problem set forth above, and the disclosed all-solid-state secondary battery comprises the solid electrolyte-containing layer described above. Using the solid electrolyte-containing layer described above, an all-solid-state secondary battery can be obtained which can exhibit good battery performance.

Advantageous Effect

According to the present disclosure, it is possible to provide a slurry composition for an all-solid-state secondary battery which has high fluidity and hence a good leveling property during application and which can form a solid electrolyte-containing layer having good ion conductivity.

According to the present disclosure, it is also possible to provide a solid electrolyte-containing layer having good ion conductivity, and an all-solid-state secondary battery which comprises a solid electrolyte-containing layer having good ion conductivity.

DETAILED DESCRIPTION

The following provides a detailed description of embodiments of the present disclosure.

The disclosed slurry composition for an all-solid-state secondary battery is used when forming a solid electrolyte-containing layer such as an electrode mixed material layer or a solid electrolyte layer, which is used in an all-solid-state secondary battery such as an all-solid-state lithium ion secondary battery. In the disclosed all-solid-state secondary battery, at least one layer selected from the group consisting of a positive electrode mixed material layer of a positive electrode, a negative electrode mixed material layer of a negative electrode, and a solid electrolyte layer is formed of the disclosed solid electrode-containing layer formed using the disclosed slurry composition.

(Slurry Composition for All-Solid-State Secondary Battery)

The disclosed slurry composition for an all-solid-state secondary battery comprises an inorganic solid electrolyte, a binder, a basic functional group-containing compound, and a solvent, and may optionally further comprise at least one component selected from the group consisting of electrode active materials, conductive materials, and other components. The disclosed slurry composition requires that the basic functional group-containing compound be contained in an amount of 0.005 parts by mass or more and 5 parts by mass or less per 100 parts by mass of the inorganic solid electrolyte.

Because the disclosed slurry composition comprises an inorganic solid electrolyte and a binder, it can be used for forming a solid electrolyte-containing layer such as an electrode mixed material layer or a solid electrolyte layer. Further, because the disclosed slurry composition comprises a basic functional group-containing compound in an amount not less than the above lower limit, it is possible to increase the fluidity of the slurry composition to thereby improve the leveling property during application. Further, because the disclosed the slurry composition comprises a basic functional group-containing compound in an amount not greater than the above upper limit, it is possible to allow a solid electrolyte-containing layer formed using the slurry composition to exhibit good ion conductivity.

While the reason why the leveling property during application of the slurry composition can be improved by including a basic functional group-containing compound in an amount not less than the above lower limit is not clear, it is presumed that the leveling property improves because the basic functional group-containing compound is adsorbed on the surface of the inorganic solid electrolyte to increase the dispersibility of the inorganic solid electrolyte. Further, while the reason why it is possible to allow a solid electrolyte-containing layer to exhibit good ion conductivity by including a basic functional group-containing compound in an amount not greater than the above upper limit is not clear, it is presumed that the solid electrolyte-containing layer can exhibit good ion conductivity because degradation of the inorganic solid electrolyte and other components included in the solid electrolyte-containing layer due to an excessive presence of the basic functional group-containing compound can be prevented.

When the disclosed slurry composition is used for forming an electrode mixed material layer (i.e., when the slurry composition is for an all-solid-state secondary battery electrode), it usually comprises an inorganic solid electrolyte, a binder, a basic functional group-containing compound, a solvent, and an electrode active material, and optionally further comprises at least one component selected from the group consisting of conductive materials and other components.

When the disclosed slurry composition is used for forming a solid electrolyte layer (i.e., when the slurry composition is for an all-solid-state secondary battery electrolyte layer), it usually does not comprise an electrode active material nor a conductive material, but comprises an inorganic solid electrolyte, a binder, a basic functional group-containing compound, and a solvent, and optionally further comprises other component(s).

<Inorganic Solid Electrolyte>

The inorganic solid electrolyte is not particularly limited. It is possible to use a crystalline inorganic ion conductor, an amorphous inorganic ion conductor or a mixture thereof as the inorganic solid electrolyte. When the all-solid-state secondary battery is an all-solid-state lithium ion secondary battery, for example, a crystalline inorganic lithium ion conductor, an amorphous inorganic lithium ion conductor or a mixture thereof can be usually used as the inorganic solid electrolyte. Among them, from the viewpoint of forming a solid electrolyte-containing layer having good ion conductivity, the inorganic solid electrolyte preferably comprises a sulfide inorganic solid electrolyte.

The following describes an example wherein the slurry composition is for an all-solid-state lithium ion secondary battery. It is to be noted, however, that the present disclosure is not limited to the example described below.

Examples of crystalline inorganic lithium ion conductors include $Li_3N$, $LISICON(Li_{14}Zn(GeO_4)_4)$, perovskite type $Li_{0.5}La_{0.5}TiO_3$, garnet type $Li_7La_3Zr_2O_{10}$, $LIPON(Li_{3+y}PO_{4-x}N_x)$, and Thio-$LISICON(Li_{3.25}Ge_{0.25}P_{0.75}S_4)$.

The crystalline inorganic lithium ion conductors described above may be used either alone or as a mixture of two or more types.

The amorphous inorganic lithium ion conductor is not particularly limited as long as the inorganic lithium ion conductor contains a sulfur atom and has ion conductivity. Examples thereof include glass Li—Si—S—O and Li—P—S, and those formed using raw material compositions containing $Li_2S$ and a sulfide of an element of the Groups 13 to 15 of the periodic table.

Examples of the elements of the Groups 13 to 15 include Al, Si, Ge, P, As and Sb. Specific examples of sulfides of elements of the Groups 13 to 15 include $Al_2S_3$, $SiS_2$, $GeS_2$, $P_2S_3$, $P_2S_5$, $As_2S_3$, and $Sb_2S_3$. Methods of synthesizing an amorphous inorganic lithium ion conductor using a raw material composition include amorphization methods such as mechanical milling and melt quenching. Preferred as the amorphous inorganic lithium ion conductor formed using a raw material composition containing $Li_2S$ and a sulfide of an element of the Groups 13 to 15 of the periodic table is $Li_2S$—$P_2S_5$, $Li_2S$—$SiS_2$, $Li_2S$—$GeS_2$ or $Li_2S$—$Al_2S_3$, with $Li_2S$—$P_2S_5$ being more preferred.

The amorphous inorganic lithium ion conductors described above may be used either alone or as a mixture of two or more types.

Amorphous inorganic lithium ion conductors are preferred as the inorganic solid electrolyte for an all-solid-state lithium ion secondary battery from the viewpoint of forming a solid electrolyte-containing layer having good ion conductivity, with amorphous sulfides containing Li and P being more preferred. Amorphous sulfides containing Li and P have high lithium ion conductivity and as such can reduce the internal resistance of a battery and also can improve the output characteristics of the battery when used as the inorganic solid electrolyte.

From the viewpoint of reducing the internal resistance and improving the output characteristics of a battery, the amorphous sulfide containing Li and P is preferably sulfide glass consisting of $Li_2S$ and $P_2S_5$, and particularly preferably sulfide glass produced from a mixed raw material of $Li_2S$ and $P_2S_5$ having a $Li_2S$:$P_2S_5$ mole ratio of 65:35 to 85:15. Further, the amorphous sulfide containing Li and P is preferably a sulfide glass-ceramics obtained by reacting a mixed raw material of $Li_2S$ and $P_2S_5$ having a $Li_2S$:$P_2S_5$ mole ratio of 65:35 to 85:15 by the mechano-chemical method. From the viewpoint of maintaining high lithium ion conductivity, the mixed raw material preferably has a $Li_2S$:$P_2S_5$ mole ratio of 68:32 to 80:20.

In addition to $Li_2S$ and $P_2S_5$, the inorganic solid electrolyte may comprise at least one sulfide selected from the group consisting of $Al_2S_3$, $B_2S_3$ and $SiS_2$ as a start material to the extent that ion conductivity does not decreases. When such a sulfide is added, the glass component in the inorganic solid electrolyte can be stabilized.

Similarly, in addition to $Li_2S$ and $P_2S_5$, the inorganic solid electrolyte may comprise at least one lithium orthooxoate selected from the group consisting of $Li_3PO_4$, $Li_4SiO_4$, $Li_4GeO_4$, $Li_3BO_3$ and $Li_3AlO_3$. When such a lithium orthooxoate is included, the glass component in the inorganic solid electrolyte can be stabilized.

<Binder>

The binder is not particularly limited. For example, a polymeric compound such as an acrylic polymer, a fluoropolymer, a diene polymer, or a nitrile polymer can be used. These polymeric compounds may be used either alone or in combination of two or more types.

In the slurry composition, the binder may be dissolved in the solvent or may be dispersed in the solvent in particulate or other form without being dissolved in the solvent.

The fluoropolymer, diene polymer, and nitrile polymer can be those described for example in JP2012243476A.

The acrylic polymer can be those described for example in WO2016/152262.

The acrylic polymer is preferable as the binder. The acrylic polymer is a polymer having a repeat unit (polymerization unit) obtained by the polymerization of an acrylate or methacrylate (hereinafter also abbreviated as "(meth)acrylate"), or a derivative thereof. Specific examples of the acrylic polymer include homopolymers of (meth)acrylates, copolymers of (meth)acrylates, and copolymers of (meth)acrylates and other monomer(s) copolymerizable with the (meth) acrylates.

Examples of (meth)acrylates include acrylic acid alkyl esters such as methyl acrylate, ethyl acrylate, n-propyl acrylate, isopropyl acrylate, n-butyl acrylate, t-butyl acrylate, and 2-ethylhexyl acrylate; acrylic acid alkoxyalkyl esters such as 2-methoxyethyl acrylate and 2-ethoxyethyl acrylate; 2-(perfluoroalkyl)ethyl acrylates such as 2-(perfluorobutyl)ethyl acrylate and 2-(perfluoropentyl)ethyl acrylate; methacrylic acid alkyl esters such as methyl methacrylate, ethyl methacrylate, n-propyl methacrylate, isopropyl methacrylate, n-butyl methacrylate, t-butyl methacrylate, 2-ethylhexyl methacrylate, lauryl methacrylate, tridecyl methacrylate, and stearyl methacrylate; and 2-(perfluoroalkyl)ethyl methacrylates such as 2-(perfluorobutyl)ethyl methacrylate, and 2-(perfluoropentyl)ethyl methacrylate. For their high adhesion to the inorganic solid electrolyte, preferred are acrylic acid alkyl esters such as methyl acrylate, ethyl acrylate, n-propyl acrylate, isopropyl acrylate, n-butyl acrylate, t-butyl acrylate, and 2-ehtylhexyl acrylate; and acrylic acid alkoxyalkyl esters such as 2-methoxyethyl acrylate and 2-ethoxyethyl acrylate.

The proportion of the polymerization unit derived from the (meth)acrylate in the acrylic polymer is usually 40% by mass or more, preferably 50% by mass or more, and more preferably 60% by mass or more. The upper limit of the proportion of the polymerization unit derived from the (meth)acrylate in the acrylic polymer is usually 100% by mass or less, and preferably 95% by mass or less.

Examples of monomers copolymerizable with the (meth)acrylates include unsaturated carboxylic acids such as acrylic acid, methacrylic acid, itaconic acid, and fumaric acid; carboxylic acid esters having two or more carbon-carbon double bonds, such as ethylene glycol dimethacrylate, diethylene glycol dimethacrylate, and trimethylolpropane triacrylate; styrene monomers such as styrene, vinyltoluene, t-butylstyrene, vinylbenzoic acid, methyl vinylbenzoate, vinylnaphthalene, hydroxymethylstyrene, α-methylstyrene, and divinylbenzene; amide monomers such as acrylamide, methacrylamide, N-methylolacrylamide, and acrylamido-2-methylpropanesulfonic acid; α,β-unsaturated nitrile compounds such as acrylonitrile and methacrylonitrile; olefins such as ethylene and propylene; diene monomers such as butadiene and isoprene; vinyl ethers such as vinyl acetate, vinyl propionate, vinyl butyrate, and vinyl benzoate; vinyl ethers such as methyl vinyl ether, ethyl vinyl ether, and butyl vinyl ether; vinyl ketones such as methyl vinyl ketone, ethyl vinyl ketone, butyl vinyl ketone, hexyl vinyl ketone, and isopropenyl vinyl ketone; and heterocycle-containing vinyl compounds such as N-vinylpyrrolidone, vinylpyridine, and vinylimidazole. Preferred are styrene monomers, amide monomers, and α,β-unsaturated nitrile compounds. In the acrylic polymer, the proportion of the polymerization unit derived from the copolymerizable monomer is usually 40% by mass or less, preferably 30% by mass or less, and more preferably 20% by mass or less.

The amount of the binder included in the slurry composition for an all-solid-state secondary battery is not particularly limited and is preferably 0.05 parts by mass or more, more preferably 0.1 parts by mass or more, and still more preferably 0.2 parts by mass or more, but preferably 5 parts by mass or less, more preferably 3 parts by mass or less, and still more preferably 2 parts by mass or less, per 100 parts by mass of the inorganic solid electrolyte. When the amount of the binder is not less than the above lower limit, a solid electrolyte-containing layer can be favorably formed. Further, when the amount of the binder is not greater than the above upper limit, it is possible to prevent the reduction of the ion conductivity of the solid electrolyte-containing layer.

<Basic Functional Group-Containing Compound>

As the basic functional group-containing compound, any compound having a basic functional group can be used. In particular, the basic functional group-containing compound is preferably a low-molecular weight compound having a basic functional group, more preferably a basic functional group-containing compound having a molecular weight of 5,000 or less, and still more preferably a basic functional group-containing compound having a molecular weight of 1,000 or less.

The basic functional group-containing compound is preferably dissolved in the solvent in the slurry composition.

One type alone or a mixture of two or more types may be used as the basic functional group-containing compound.

[Basic Functional Group]

Examples of basic functional groups of the basic functional group-containing compound include nitrogen-containing basic functional groups such as optionally substituted amino groups such as $-NH_2$, $-NHR^1$, and $-NR^1R^2$ (where $R^1$ and $R^2$ each independently represent any substituent, which is preferably an alkyl group, more preferably an alkyl group having 1 to 6 carbons); imino group ($=NH$); oxazoline group; and nitrile group. From the viewpoint of achieving a high leveling property of the slurry composition during application and a high ion conductivity of the solid electrolyte-containing layer at the same time, preferred among the foregoing are basic functional groups which have a nitrogen atom having an unpaired electron, with optionally substituted amino groups and nitrile group being more preferred, and the unsubstituted amino group ($-NH_2$) being still more preferred.

[Structure]

The basic functional group-containing compound may be cyclic or acyclic compound as long as it has the basic functional group described above. The basic functional group-containing compound is preferably an acyclic compound from the viewpoint of further increasing the fluidity of the slurry composition to thereby further improve the leveling property during application.

The basic functional group-containing compound is not particularly limited, and examples thereof include amines such as methylamine, ethylamine, n-propylamine, isopropylamine, dimethylamine, diethylamine, methylethylamine, trimethylamine, triethylamine, imidazole, and 4-methylimidazole; imines such as methanimine and ethanimine; oxazolines such as 2-ethyl-2-oxazoline; and nitriles such as acetonitrile, propionitrile, and isobutyronitrile, with isopropylamine, dimethylamine, trimethylamine, isobutyronitrile, and 4-methylimidazole being preferred, isopropylamine, dimethylamine, and isobutyronitrile being more preferred, and isopropylamine being still more preferred.

Among the foregoing, the basic functional group-containing compound preferably comprises at least one compound selected from the group consisting of amines and nitriles, more preferably is a primary amine and/or a secondary amine, and still more preferably is a primary amine. When the basic functional group-containing compound comprises the above-described compound(s), it is possible to achieve a high leveling property of the slurry composition during application and a high ion conductivity of the solid electrolyte-containing layer at the same time.

In addition, from the viewpoint of achieving a high leveling property of the slurry composition during application and a high ion conductivity of the solid electrolyte-containing layer at the same time, the basic functional group-containing compound is preferably a compound having a hydrocarbon group, and more preferably a compound having a hydrocarbon group having 3 or more carbon atoms.

The hydrocarbon group is preferably an alkyl group. The hydrocarbon group is preferably bound to the basic functional group (in other words, the basic functional group-containing compound is preferably a compound in which at least one of the hydrogen atoms of the hydrocarbon compound is replaced by the basic functional group).

The basic functional group-containing compound having a hydrocarbon group is preferably an alkylamine and/or an alkylnitrile, more preferably an alkylamine, still more preferably a primary alkylamine and/or a secondary alkylamine, and particularly preferably a primary alkylamine.

[Amount]

The amount of the basic functional group-containing compound in the slurry composition needs to be 0.005 parts by mass or more and 5 parts by mass or less per 100 parts by mass of the inorganic solid electrolyte, and is preferably 0.05 parts by mass or more, and more preferably 0.1 parts by mass or more, but preferably 2 parts by mass or less, and more preferably 1 part by mass or less. When the amount of the basic functional group-containing compound is not less than the above lower limit, the dispersibility of the inorganic solid electrolyte can be enhanced to thereby improve the leveling property of the slurry composition during application. When the amount of the basic functional group-containing compound is not greater than the above upper limit, degradation of the components included in the solid electrolyte-containing layer is prevented thereby allowing the solid electrolyte-containing layer to exhibit good ion conductivity.

<Solvent>

The solvent is not particularly limited and examples thereof include chain aliphatic hydrocarbons such as hexane; cyclic aliphatic hydrocarbons such as cyclopentane and cyclohexane; aromatic hydrocarbons such as toluene and xylene; ketones such as ethyl methyl ketone, diisobutyl ketone, and cyclohexanone; esters such as ethyl acetate, butyl acetate, butyl butyrate, γ-butyrolactone, and ε-caprolactone; acylonitriles such as acetonitrile and propionitrile; ethers such as tetrahydrofuran, ethylene glycol diethyl ether, and n-butyl ether; alcohols such as methanol, ethanol, isopropanol, ethylene glycol, and ethylene glycol monomethyl ether; and amides such as N-methylpyrrolidone and N,N-dimethylformamide.

From the viewpoint of preventing the degradation of the inorganic solid electrolyte to obtain a solid electrolyte-containing layer having good ion conductivity, it is preferred to use hexane, diisobutyl ketone, butyl butyrate, or xylene.

The above-described solvents may be used either alone or as a mixture of two or more types.

<Electrode Active Material>

The electrode active material is a material that gives and receives electrons in an electrode of an all-solid-state secondary battery. When the all-solid-state secondary battery is, for example, an all-solid-state lithium ion secondary battery, a material capable of storing and releasing lithium is usually used as the electrode active material.

The following describes an example wherein the slurry composition is for an all-solid-state lithium ion secondary battery. It is to be noted, however, that the present disclosure is not limited to the example described below.

The positive electrode active material for an all-solid-state lithium ion secondary battery is not particularly limited, and examples thereof include those made of inorganic compounds and those made of organic compounds. The positive electrode active material may be a mixture of an inorganic compound and an organic compound.

Examples of positive electrode active materials made of inorganic compounds include transition metal oxides, composite oxides of lithium and transition metals (lithium-containing composite metal oxides), and transition metal sulfides. The transition metals include Fe, Co, Ni, and Mn. Specific examples of inorganic compounds used for positive active materials include lithium-containing composite metal oxides such as $LiCoO_2$ (lithium cobalt oxide), $LiNiO_2$, $LiMnO_2$, $LiMn_2O_4$, $LiFePO_4$, and $LiFeVO_4$; transition metal sulfides such as $TiS_2$, $TiS_3$, and amorphous $MoS_2$; and transition metal oxides such as $Cu_2V_2O_3$, amorphous $V_2O$—$P_2O_5$, $MoO_3$, $V_2O_5$, and $V_6O_{13}$. These compounds may be those that have undergone partial element substitution.

The positive electrode active materials made of inorganic compounds may be used either alone or as a mixture of two or more types.

Examples of positive electrode active materials made of organic compounds include polyaniline, polypyrrole, polyacene, disulfide compounds, polysulfide compounds, and N-fluoropyridinium salts.

The positive electrode active materials made of organic compounds may be used either alone or as a mixture of two or more types.

Examples of negative electrode active materials for all-solid-state lithium ion secondary batteries include allotropes of carbon, such as graphite and coke. Negative electrode active materials made of allotropes of carbon can also be mixed with, or covered with, metals, metal salts or oxides. Negative electrode active materials that can be used herein also include oxides or sulfates of silicon, tin, zinc, manganese, iron, nickel or the like; elemental lithium; lithium alloys such as Li—Al, Li—Bi—Cd, and Li—Sn—Cd; lithium transition metal nitrides; silicones; and so forth.

The negative electrode active materials described above may be used either alone or as a mixture of two or more types.

<Conductive Material>

The conductive material serves to ensure an electrical contact between the electrode active materials in an electrode mixed material layer formed using the slurry composition for an all-solid-state secondary battery (slurry composition for an all-solid-state secondary battery electrode). Examples of conductive materials that can be used herein include conductive carbon materials such as carbon black (e.g., acetylene black, Ketjen black® ("Ketjen black" is a registered trademark in Japan, other countries, or both), furnace black), single-walled or multi-walled carbon nanotubes (multi-walled carbon nanotubes include cup stack carbon nanotubes), carbon nanohorns, vapor-grown carbon fibers, milled carbon fibers obtained by crushing polymer fibers after firing, single-walled or multi-walled graphene, and carbon nonwoven sheets obtained by firing a nonwoven fabric made of polymer fiber; and fibers or foils made of various metals.

These conductive materials may be used either alone or as a mixture of two or more types.

The amount of the conductive material in the slurry composition for an all-solid-state secondary battery is preferably 0.1 parts by mass or more, and more preferably 0.5 parts by mass or more, but preferably 5 parts by mass or less, and more preferably 3 parts by mass or less, per 100 parts by mass of the electrode active material. When the amount of the conductive material falls within the above range, it is possible to ensure that the electrode active materials are brought into electrical contact with each other, allowing an all-solid-state secondary battery to exhibit good battery characteristics (e.g., output characteristics).

<Other Components>

Examples of other components optionally included in the slurry composition for an all-solid-state secondary battery include dispersants, leveling agents, defoaming agents, and reinforcing materials. When the all-solid-state secondary battery is an all-solid-state lithium ion secondary battery, other components include lithium salts. Other components are not particularly limited as long as they do not affect the battery reaction.

Other components such as lithium salts, dispersants, leveling agents, defoaming agents and reinforcing materials are not particularly limited and those described in JP2012243476A can be used. Further, the blending amounts of other components are not particularly limited. Other components can be blended in amounts described in JP2012243476A.

<Production of Slurry Composition>

Methods of producing the slurry composition for an all-solid-state secondary battery described above are not particularly limited and the slurry composition can be obtained for example by dispersing or dissolving the above-described components in a solvent using any mixing method.

(Solid Electrolyte-Containing Layer)

The disclosed solid electrolyte-containing layer is a layer which comprises an inorganic solid electrolyte. Examples of solid electrolyte-containing layers include electrode mixed material layers (positive and negative electrode mixed material layers) for giving and receiving electrons through electrochemical reactions, and a solid electrolyte layer provided between positive and negative electrode mixed material layers facing each other.

The disclosed solid electrolyte-containing layer is formed using the slurry composition for an all-solid-state secondary battery, and can be formed for example by applying the slurry composition on a surface of an appropriate substrate to form thereon a coating film and drying the formed coating film. Namely, the disclosed solid electrolyte-containing layer is formed of a dried product of the slurry composition and usually comprises an inorganic solid electrolyte, a binder, and a basic functional group-containing compound, and may optionally further comprise at least one component selected from the group consisting of electrode active materials, conductive materials, and other components. Each component included in the solid electrolyte-containing layer derives from the slurry composition and the proportion of each component is usually equal to that in the slurry composition.

The disclosed solid electrolyte-containing layer is formed of the disclosed slurry composition for an all-solid-state secondary battery and as such can exhibit good ion conductivity.

<Substrate>

There is no limitation on the substrate on which the slurry composition is to be applied. For example, a coating film of the slurry composition may be formed on the surface of a releasable substrate, the coating film may be dried to form a solid electrolyte-containing layer, and the releasable substrate may be peeled from the solid electrolyte-containing layer. Thus, the solid electrolyte-containing layer peeled off from the releasable substrate can also be used as a self-supporting film for forming a battery member (e.g., an electrode or a solid electrolyte layer) of an all-solid-state secondary battery.

However, from the viewpoint of increasing the production efficiency of a battery member by not performing the step of peeling off the solid electrolyte-containing layer, it is preferable to use a current collector or an electrode as the substrate. Specifically, the slurry composition is preferably applied on a current collector as a substrate when preparing an electrode mixed material layer. When preparing a solid electrolyte layer, the slurry composition is preferably applied on an electrode (positive or negative electrode).

[Current Collector]

For the current collector, materials having electrical conductivity and electrochemical durability are used. Specifically, the current collector may be made of, for example, iron, copper, aluminum, nickel, stainless steel, titanium, tantalum, gold, or platinum. Of these materials, copper foil is particularly preferable as a current collector used for a negative electrode. On the other hand, aluminum foil is particularly preferable as a current collector used for a positive electrode. These materials may be used either alone or as a mixture of two or more types mixed at any ratio.

[Electrodes]

The electrodes (positive and negative electrodes) are not particularly limited, and examples thereof include electrodes in which an electrode mixed material layer containing an electrode active material, an inorganic solid electrolyte, and a binder is formed on the current collector described above.

The electrode active material, the inorganic solid electrolyte, and the binder included in the electrode mixed material layer of the electrode are not particularly limited and those known in the art can be used. Note that the electrode mixed material layer in the electrode may correspond to the disclosed solid electrolyte-containing layer.

<Method of Forming Solid Electrolyte-Containing Layer>

Methods of forming a solid electrolyte-containing layer on the substrate described above such as a current collector or an electrode include:

1) applying the disclosed slurry composition on a substrate surface (hereinafter, in the case of applying on an electrode, the substrate surface refers to a surface on the electrode mixed material layer side of the electrode) and drying the composition;
2) immersing a substrate in the disclosed slurry composition and drying the composition; and
3) applying the disclosed slurry composition on a releasable substrate and drying the composition to form thereon a solid electrolyte-containing layer, and transferring the solid electrolyte-containing layer to a surface of an electrode or other substrate.

Among the foregoing methods, the method 1) is particularly preferred because the thickness of the solid electrolyte-containing layer can be easily controlled. In detail, the method 1) includes applying the slurry composition on a substrate (applying step), and drying the slurry composition applied on the substrate to form thereon a solid electrolyte-containing layer (solid electrolyte-containing layer forming step).

[Applying Step]

Methods of applying the slurry composition on a substrate in the applying step are not particularly limited. Application can be accomplished for example by doctor blade coating, reverse roll coating, direct roll coating, gravure coating, extrusion coating, or brush coating.

[Solid Electrolyte-Containing Layer Forming Step]

Methods of drying the slurry composition applied on the substrate in the solid electrolyte-containing layer forming step are not specifically limited and any drying method known in the art can be used. Examples of drying methods that can be used herein include drying by warm, hot, or low-humidity air, drying in a vacuum, and drying by irradiation with infrared light, electron beams, or the like.

When the solid electrolyte-containing layer is an electrode mixed material layer, a pressing step is preferably performed using a roll press or the like after drying. The pressing step can further increase the density of the obtained electrode mixed material layer.

(Electrode)

The electrode in which an electrode mixed material layer is formed on a current collector using the disclosed slurry composition for an all-solid-state secondary battery comprises such an electrode mixed material layer which comprises an inorganic solid electrolyte, a binder, a basic functional group-containing compound, and an electrode active material, and optionally further comprises at least one component selected from the group consisting of conductive materials and other components, and can exhibit good ion conductivity.

(Solid Electrolyte Layer)

The solid electrolyte layer formed using the disclosed slurry composition for an all-solid-state secondary battery comprises an inorganic solid electrolyte, a binder, and a basic functional group-containing compound, and optionally further comprises other component(s), and can exhibit good ion conductivity.

(All-Solid-State Secondary Battery)

The disclosed all-solid-state secondary battery usually comprises a positive electrode, a solid electrolyte layer, and a negative electrode, wherein at least one of the positive electrode mixed material layer of the positive electrode, the negative electrode mixed material layer of the negative electrode, and the solid electrolyte layer is the disclosed solid electrolyte-containing layer. Specifically, the disclosed all-solid-state secondary battery comprises at least one of: a positive electrode comprising a positive electrode mixed material layer formed using a slurry composition for an all-solid-state secondary battery positive electrode as the disclosed slurry composition; a negative electrode comprising a negative electrode mixed material layer formed using a slurry composition for an all-solid-state secondary battery negative electrode as the disclosed slurry composition; and a solid electrolyte layer formed using a slurry composition for an all-solid-state secondary battery electrolyte layer as the disclosed slurry composition.

The disclosed all-solid-state secondary battery comprises the disclosed solid-electrolyte-containing layer and as such has good battery performance such as output characteristics.

All-solid-state secondary battery electrodes which can be used in the disclosed all-solid-state secondary battery and which include an electrode mixed material layer which does not correspond to the disclosed solid electrolyte-containing layer are not particularly limited as long as they comprise an electrode mixed material layer which does not correspond to the disclosed solid electrolyte-containing layer. It is possible to use any all-solid-state secondary battery electrode.

Solid electrolyte layers which can be used in the disclosed all-solid-state secondary battery and which do not correspond to the disclosed solid electrolyte-containing layer are not particularly limited and any solid electrolyte layer such as those described for example in JP2012243476A, JP2013143299A, and JP2016143614A can be used.

The disclosed all-solid-state secondary battery can be obtained for example by: stacking a positive electrode and a negative electrode with a solid electrolyte layer disposed therebetween such that the positive electrode mixed material layer of the positive electrode and the negative electrode mixed material layer of the negative electrode face each other across the solid electrolyte layer, and optionally pressing the resulting stack to form a laminate; placing the laminate in a battery container as it is or after rolled or folded as necessary according to the battery shape; and sealing the battery container. In order to prevent pressure increases inside the battery and occurrence of overcharging or overdischarging, an overcurrent preventing device such as a fuse or a PTC device, an expanded metal, or a lead plate may be provided as necessary. The battery may be of any shape, such as coin, button, sheet, cylindrical, square, or flattened shape.

EXAMPLES

The following provides a more specific description of the present disclosure based on Examples, which however shall not be construed as limiting the scope of the present disclosure. In the following description, "%" and "part" used in expressing quantities are by mass unless otherwise specified.

In Examples and Comparative Examples, the leveling property of the slurry composition and the ion conductivity of the solid electrolyte-containing layer were evaluated by the methods described below.

<Leveling Property>

A flat-bottomed cylindrical transparent glass tube having an inner diameter of 30 mm and a height of 120 mm was provided. The glass tube was given two marked lines at heights of 55 mm and 85 mm from the bottom of the tube (hereinafter, the marked line at a height of 55 mm is referred to as "line A" and the marked line at a height of 85 mm is referred to as "line B").

Next, the prepared slurry composition was placed into the glass tube to a height of line A and the glass tube was closed with a rubber cap. The glass tube was left to stand upright for 10 minutes in a 25° C. environment.

The time t from placing the glass tube on its side horizontally until the tip of the liquid surface of the slurry composition passes line B was then measured. The leveling property was evaluated based on the criteria given below. The shorter the time t until the tip of the liquid surface passes line B, the higher the fluidity of the slurry composition, indicating that the slurry composition has a good leveling property during application.

A: Time t is less than 1 second.
B: Time t is 1 second or more and less than 5 seconds
C: Time t is 5 seconds or more and less than 10 seconds
D: Time t is 10 seconds or more <Ion Conductivity>

The prepared slurry composition was placed in a glove box under an argon atmosphere for 10 days. The slurry composition was dried on a hot plate at 130° C., and 0.1 g of the obtained powder was compacted into a cylinder having a diameter of 11.28 mm and a height of 0.5 mm at a compaction pressure of 250 MPa to prepare a measurement sample.

The measurement sample was measured for Li ion conductivity by the AC impedance method at normal temperature (25° C.). The measurement was made using Solartron 1260. The measurement conditions were as follows: applied voltage: 10 mV, measurement frequency range: 0.01 MHz to 30 MHz.

Taking the Li ion conductivity of a sample obtained by compacting a powder of an inorganic solid electrolyte alone as 100%, the magnitude of the Li ion conductivity of the measurement sample was determined based on the criteria given below. The larger the value, the better the ion conductivity the solid electrolyte-containing layer prepared using the slurry composition can exhibit.

A: Li ion conductivity is 30% or more
B: Li ion conductivity is 20% or more and less than 30%
C: Li ion conductivity is 10% or more and less than 20%
D: Li ion conductivity is less than 10%

Example 1

<Production of Binder>

To a 5 MPa pressure-resistant container fitted with a stirrer were added 30 parts of ethyl acrylate, 70 parts of butyl acrylate, 1 part of ethylene glycol dimethacrylate as a cross-linker, 1 part of sodium dodecylbenzenesulfonate as an emulsifier, 150 parts of ion-exchanged water, and 0.5 parts of potassium persulfate as a polymerization initiator, and the mixture was sufficiently stirred and heated to 70° C.

to initiate polymerization. Cooling was initiated at the point when the polymerization conversion rate reached 96% to quench the reaction to yield a water dispersion of an acrylic polymer. The average particle diameter of the particulate acrylic polymer contained in the water dispersion was 0.24 µm.

The water dispersion was adjusted to pH 7 by the addition of 10% aqueous sodium hydroxide solution to prepare a water dispersion having a solid concentration of 38%.

To 100 parts of the water dispersion was added 500 parts of xylene and the mixture was subjected to vacuum evaporation on a rotary evaporator at a water bath temperature of 80° C. for solvent exchange and dehydration.

The dehydration operation yielded an organic solvent dispersion containing the particulate acrylic polymer as a binder. The organic solvent dispersion had a moisture concentration of 38 ppm and a solid concentration of 7.5%.

<Production of Slurry Composition for All-Solid-State Secondary Battery>

100 parts of sulfide glass made of $Li_2S$ and $P_2S_5$ ($Li_2S$:$P_2S_5$=70 mol %:30 mol %, number average particle size: 1.2 µm, cumulative 90% particle size: 2.1 µm) as an inorganic solid electrolyte, 1 part of solids of the xylene dispersion of the acrylic polymer, and 0.2 parts of isopropylamine as a basic functional group-containing compound were mixed. Xylene was added as a solvent to the mixture to adjust the solid concentration to 30% and then mixed by a planetary mixer to prepare a slurry composition for an all-solid-state secondary battery.

Leveling property and ion conductivity were then measured. The results are shown in Table 1.

Examples 2 to 4

Slurry compositions for an all-solid-state secondary battery were prepared as in Example 1 except that the amount of isopropylamine was changed to 1.5 parts (Example 2), 0.07 parts (Example 3) or 4 parts (Example 4) when preparing the slurry composition.

Evaluations were made as in Example 1. The results are shown in Table 1.

Examples 5 to 8

Slurry compositions for an all-solid-state secondary battery were prepared as in Example 1 except that isopropylamine was replaced by isobutyronitrile (Example 5), 4-methylimidazole (Example 6), dimethylamine (Example 7) or trimethylamine (Example 8) when preparing the slurry composition.

Evaluations were made as in Example 1. The results are shown in Table 1.

Examples 9 to 11

Slurry compositions for an all-solid-state secondary battery were prepared as in Example 1 except that xylene was replaced by hexane (Example 9), diisobutyl ketone (Example 10) or n-butyl ether (Example 11) when preparing the binder and the slurry composition.

Evaluations were made as in Example 1. The results are shown in Table 1.

Comparative Example 1

A slurry composition for an all-solid-state secondary battery was prepared as in Example 1 except that isopropylamine was not used when preparing the slurry composition.

Evaluations were made as in Example 1. The results are shown in Table 1.

Comparative Example 2

A slurry composition for an all-solid-state secondary battery was prepared as in Example 1 except that the amount of isopropylamine was changed to 8 parts when preparing the slurry composition. Evaluations were made as in Example 1. The results are shown in Table 1.

TABLE 1

| | | Example 1 | Example 2 | Example 3 | Example 4 | Example 5 | Example 6 | Example 7 |
|---|---|---|---|---|---|---|---|---|
| Inorganic solid electrolyte | Blending amount [parts by mass] | 100 | 100 | 100 | 100 | 100 | 100 | 100 |
| Basic functional group-containing compound | Type | Isopropyl-amine | Isopropyl-amine | Isopropyl-amine | Isopropyl-amine | Isobutyro-nitrile | 4-Methyl-imidazole | Dimethyl-amine |
| | Blending amount [parts by mass] | 0.2 | 1.5 | 0.07 | 4 | 0.2 | 0.2 | 0.2 |
| Binder | Type | Acrylic polymer | Acrylic polymer | Acrylic polymer | Acrylic polymer | Acrylic polymer | Acrylic polymer | Acrylic polymer |
| | Blending amount [parts by mass] | 1 | 1 | 1 | 1 | 1 | 1 | 1 |
| Solvent | Type | Xylene | Xylene | Xylene | Xylene | Xylene | Xylene | Xylene |
| Leveling property | | A | A | B | A | B | C | B |
| Ion conductivity | | A | B | A | C | A | A | A |

TABLE 1-continued

|  |  | Example 8 | Example 9 | Example 10 | Example 11 | Comparative Example 1 | Comparative Example 2 |
|---|---|---|---|---|---|---|---|
| Inorganic solid electrolyte | Blending amount [parts by mass] | 100 | 100 | 100 | 100 | 100 | 100 |
| Basic functional group-containing compound | Type | Trimethyl-amine | Isopropyl-amine | Isopropyl-amine | Isopropyl-amine | — | Isopropyl-amine |
|  | Blending amount [parts by mass] | 0.2 | 0.2 | 0.2 | 0.2 | — | 8 |
| Binder | Type | Acrylic polymer | Acrylic polymer | Acrylic polymer | Acrylic polymer | Acrylic polymer | Acrylic polymer |
|  | Blending amount [parts by mass] | 1 | 1 | 1 | 1 | 1 | 1 |
| Solvent | Type | Xylene | Hexane | Diisobutyl ketone | n-Butyl ether | Xylene | Xylene |
| Leveling property |  | C | A | A | C | D | A |
| Ion conductivity |  | A | A | A | B | B | D |

It is evident from Table 1 that the slurry compositions for an all-solid-state secondary battery of Examples 1 to 11 had high fluidity and a good leveling property during application and were able to form a solid electrolyte-containing layer having good ion conductivity.

On the other hand, it is evident from Table 1 that the slurry composition of Comparative Example 1 which comprises no basic functional group-containing compound had low fluidity and a poor leveling property during application. It is also evident from Table 1 that the slurry composition of Comparative Example 2 which comprises a large amount of a basic functional group-containing compound undesirably reduced the ion conductivity of the resulting solid electrolyte-containing layer.

INDUSTRIAL APPLICABILITY

According to the present disclosure, it is possible to provide a slurry composition for an all-solid-state secondary battery which has high fluidity and hence a good leveling property during application and which can form a solid electrolyte-containing layer having good ion conductivity.

According to the present disclosure, it is also possible to provide a solid electrolyte-containing layer having good ion conductivity, and an all-solid-state secondary battery which comprises a solid electrolyte-containing layer having good ion conductivity.

The invention claimed is:

1. A slurry composition for an all-solid-state secondary battery, comprising an inorganic solid electrolyte, a binder, a basic functional group-containing compound, and a solvent,
wherein an amount of the basic functional group-containing compound is 0.005 parts by mass or more and 5 parts by mass or less per 100 parts by mass of the inorganic solid electrolyte, and
wherein the basic functional group-containing compound comprises isopropylamine, isobutyronitrile, 4-methylimidazole, dimethylamine, or trimethylamine.

2. The slurry composition for an all-solid-state secondary battery according to claim 1, wherein the basic functional group-containing compound has a hydrocarbon group having 3 or more carbon atoms.

3. The slurry composition for an all-solid-state secondary battery according to claim 1, wherein the basic functional group-containing compound is an acyclic compound.

4. The slurry composition for an all-solid-state secondary battery according to claim 1, wherein the basic functional group-containing compound is a primary amine or a secondary amine.

5. The slurry composition for an all-solid-state secondary battery according to claim 1, wherein the solvent is at least one solvent selected from the group consisting of hexane, diisobutyl ketone, butyl butyrate, and xylene.

6. The slurry composition for an all-solid-state secondary battery according to claim 1, wherein the inorganic solid electrolyte comprises a sulfide inorganic solid electrolyte.

7. The slurry composition for an all-solid-state secondary battery according to claim 1, further comprising an electrode active material.

8. The slurry composition for an all-solid-state secondary battery according to claim 7, further comprising a conductive material.

9. A solid electrolyte-containing layer formed using the slurry composition for an all-solid-state secondary battery according to claim 1.

10. An all-solid-state secondary battery comprising the solid electrolyte-containing layer according to claim 9.

* * * * *